(12) United States Patent
Cogley

(10) Patent No.: US 9,021,992 B1
(45) Date of Patent: May 5, 2015

(54) DOG TOOTH BRUSHING SYSTEM

(71) Applicant: Thomas Paul Cogley, Pinellas Park, FL (US)

(72) Inventor: Thomas Paul Cogley, Pinellas Park, FL (US)

(*) Notice: Subject to any disclaimer, the term of this patent is extended or adjusted under 35 U.S.C. 154(b) by 0 days.

(21) Appl. No.: 14/457,880

(22) Filed: Aug. 12, 2014

Related U.S. Application Data

(63) Continuation-in-part of application No. 13/894,772, filed on May 15, 2013, which is a continuation-in-part of application No. 12/987,098, filed on Jan. 8, 2011, now abandoned.

(51) Int. Cl.
 *A01D 5/00* (2006.01)
 *A61D 5/00* (2006.01)
 *A01K 25/00* (2006.01)

(52) U.S. Cl.
 CPC .. *A61D 5/00* (2013.01); *A01K 25/00* (2013.01)

(58) Field of Classification Search
 CPC ....... A61D 5/00; A01K 25/00; A01K 15/025; A61C 19/04; A61C 19/043; A61C 19/063; A61C 1/10; A61C 1/16; A61C 1/18; A61C 3/00
 USPC ................ 119/831, 832, 833, 856, 858, 174; 433/1
 See application file for complete search history.

(56) References Cited

U.S. PATENT DOCUMENTS

| 6,164,246 | A  | * | 12/2000 | Naftaly et al. | 119/720 |
| 7,891,321 | B2 | * | 2/2011 | Slank | 119/831 |

* cited by examiner

*Primary Examiner* — Yvonne Abbott-Lewis

(57) ABSTRACT

A windowed muzzle has left and right side sections, a lower section, an upper section and a rear section. A left window is in the left side section and a similarly configured right window is in the right side section. A left flap is configured and sized to cover the left window and a similarly configured right flap is configured and sided to cover the right window. A securement assembly selectively retains each flap in a raised orientation above the window or in a lowered orientation covering the window. A brushing assembly has a flexible strap coupled to the lower section. The brushing assembly includes a toothbrush removably coupled to the flexible strap.

6 Claims, 3 Drawing Sheets

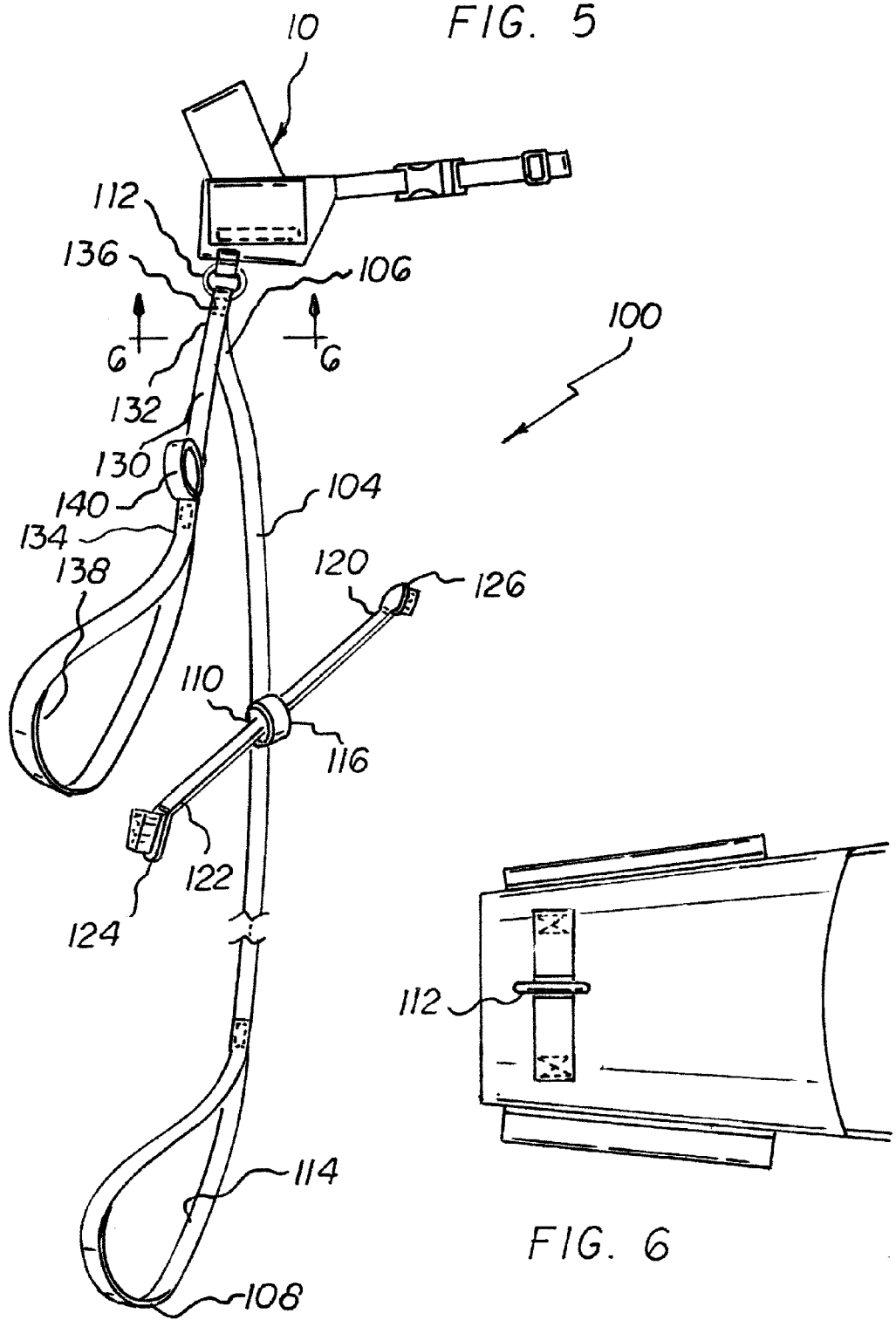

DOG TOOTH BRUSHING SYSTEM

RELATED APPLICATION

The present application is a continuation-in-part of U.S. patent application Ser. No. 13/894,772 filed May 15, 2013 which is continuation-in-part of U.S. patent application Ser. No. 12/987,098 filed Jan. 8, 2011, the subject matter of which application is incorporated herein by reference.

BACKGROUND OF THE INVENTION

1. Field of the Invention

The present invention relates to a dog tooth brushing system and more particularly pertains to removably positioning adjacent to a face of a dog, retaining a jaw of the dog closed and selectively providing access to an oral cavity of the dog, the positioning and retaining and brushing being done economically in a safe and convenient manner to the dog and to a care giver.

2. Description of the Prior Art

The use of muzzles and tooth brushes for dogs of known designs and configurations is known in the prior art. More specifically, muzzles and brushes for dogs of known designs and configurations previously devised and utilized for the purpose of muzzling dogs and brushing dogs teeth are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe a tooth brushing system for dogs that allows removable positioning over the face of a dog, retaining the jaw of the dog in position, and selectively providing access to an oral cavity of the dog, the positioning and retaining and brushing being done economically in a safe and convenient manner to the dog and to a care giver.

In this respect, the dog tooth brushing system according to the present invention substantially departs from the conventional concepts and designs of the prior art, and in doing so provides an apparatus primarily developed for the purpose of removable positioning over the face of a dog, retaining the jaw of the dog in position and selectively providing access to an oral cavity of the dog, the positioning and retaining and brushing being done economically in a safe and convenient manner to the dog and to a care giver.

Therefore, it can be appreciated that there exists a continuing need for a new and improved dog tooth brushing system which can be used for removable positioning over the face of a dog, retaining the jaw of the dog in position and selectively providing access to an oral cavity of the dog while tooth brushing, the positioning and retaining and brushing being done economically in a safe and convenient manner to the dog and to a care giver. In this regard, the present invention substantially fulfills this need.

SUMMARY OF THE INVENTION

In view of the disadvantages inherent in the known types of muzzles and dog tooth brushes of known designs and configurations now present in the prior art, the present invention provides an improved dog tooth brushing system. As such, the general purpose of the present invention, which will be described subsequently in greater detail, is to provide a new and improved dog tooth brushing system and method which has all the advantages of the prior art and none of the disadvantages.

To attain this, the present invention essentially comprises a windowed muzzle having left and right side sections, a lower section, an upper section and a rear section. A left window is in the left side section and a similarly configured right window is in the right side section. A left flap is configured and sized to cover the left window and a similarly configured right flap is configured and sided to cover the right window. A securement assembly selectively retains each flap in a raised orientation above the window or in a lowered orientation covering the window. A brushing assembly has a flexible strap coupled to the lower section. The brushing assembly includes a toothbrush removably coupled to the flexible strap.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved dog tooth brushing system which has all of the advantages of the prior art muzzles and dog tooth brushes of known designs and configurations and none of the disadvantages.

It is another object of the present invention to provide a new and improved dog tooth brushing system which may be easily and efficiently manufactured and marketed.

It is further object of the present invention to provide a new and improved dog tooth brushing system which is of durable and reliable constructions.

An even further object of the present invention is to provide a new and improved dog tooth brushing system which is susceptible of a low cost of manufacture with regard to both materials and labor, and which accordingly is then susceptible of low prices of sale to the consuming public, thereby making such dog tooth brushing system economically available to the buying public.

Lastly, it is an object of the present invention to provide a new and improved dog tooth brushing system for removable positioning over the face of a dog, retaining the jaw of the dog in position, selectively providing access to the oral cavity of the dog, and brushing the teeth of the dog, the positioning and retaining and brushing being done economically in a safe and convenient manner to the dog and to a care giver.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a side elevational view of the dog tooth brushing system illustrating the relationship of the muzzle with regard to the straps and the toothbrush.

FIG. 6 is a bottom view of the dog tooth brushing system taken along line 6-6 of FIG. 5.

The same reference numerals refer to the same parts throughout the various Figures.

DESCRIPTION OF THE PREFERRED EMBODIMENT

Figure 1:
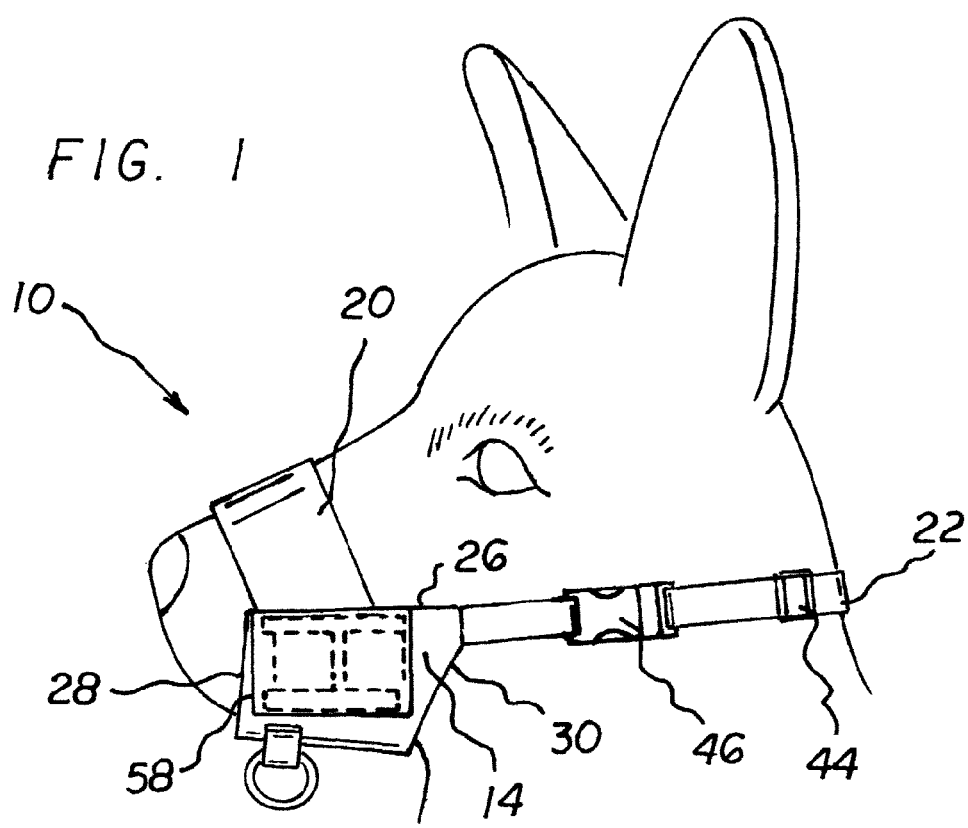
FIG. 1 is a side elevational view of a windowed muzzle constructed in accordance with the principles of the present invention, the system being illustrated on a dog.
Figure 2:
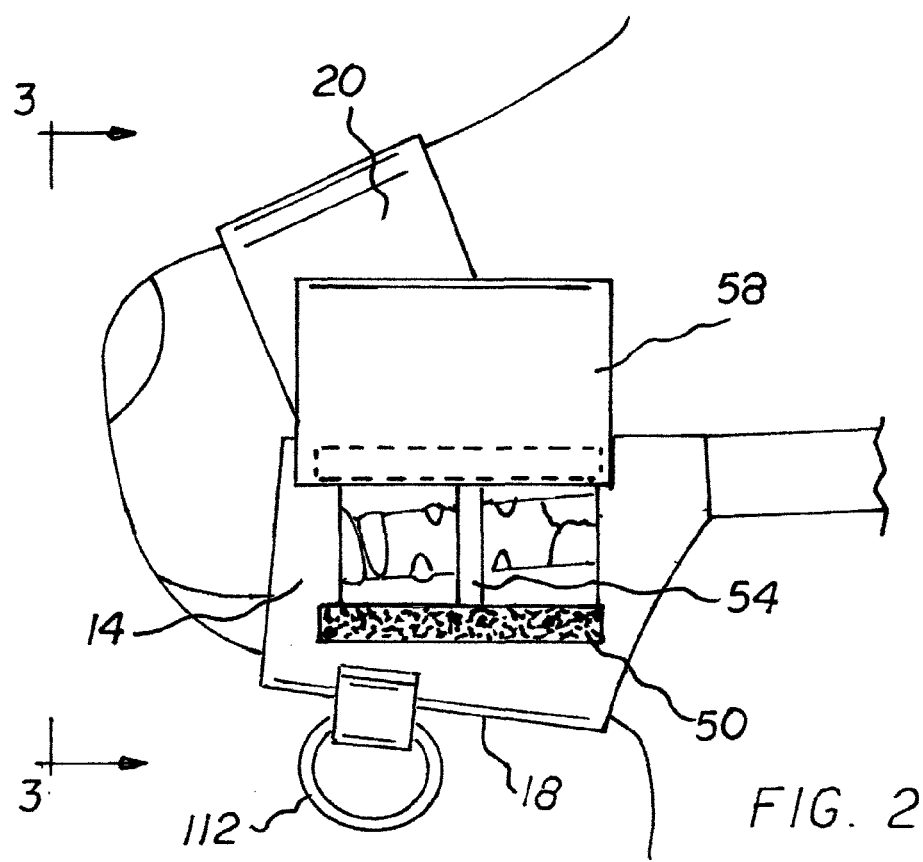
FIG. 2 is an enlarged side elevational view of the front portion of the system shown in FIG. 1 but with the window opened.
Figure 3:
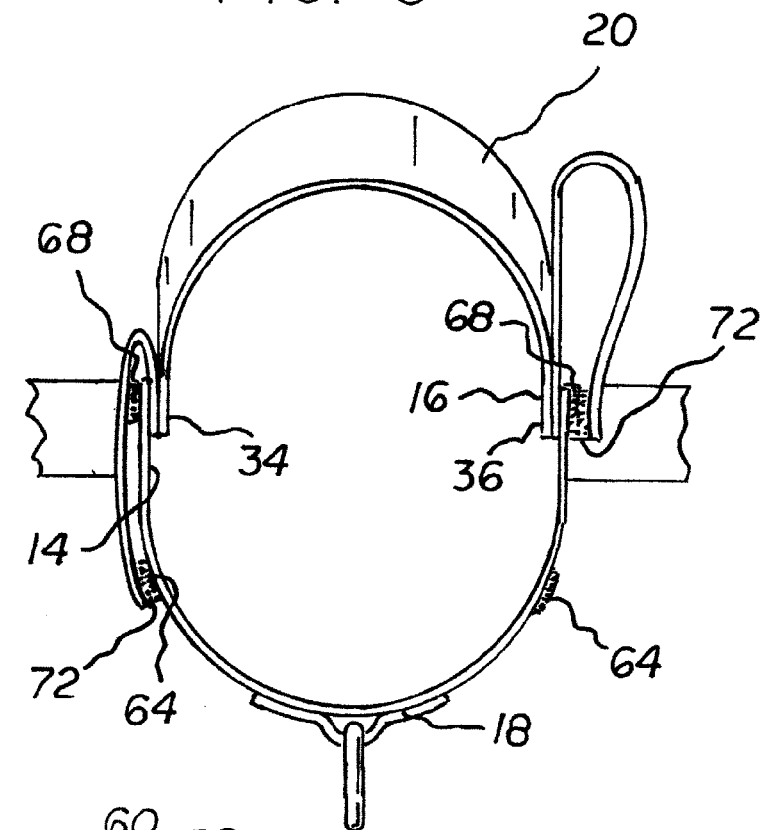
FIG. 3 is a front elevational view of the muzzle taken along line 3-3 of FIG. 2 but not showing the dog.
Figure 4:
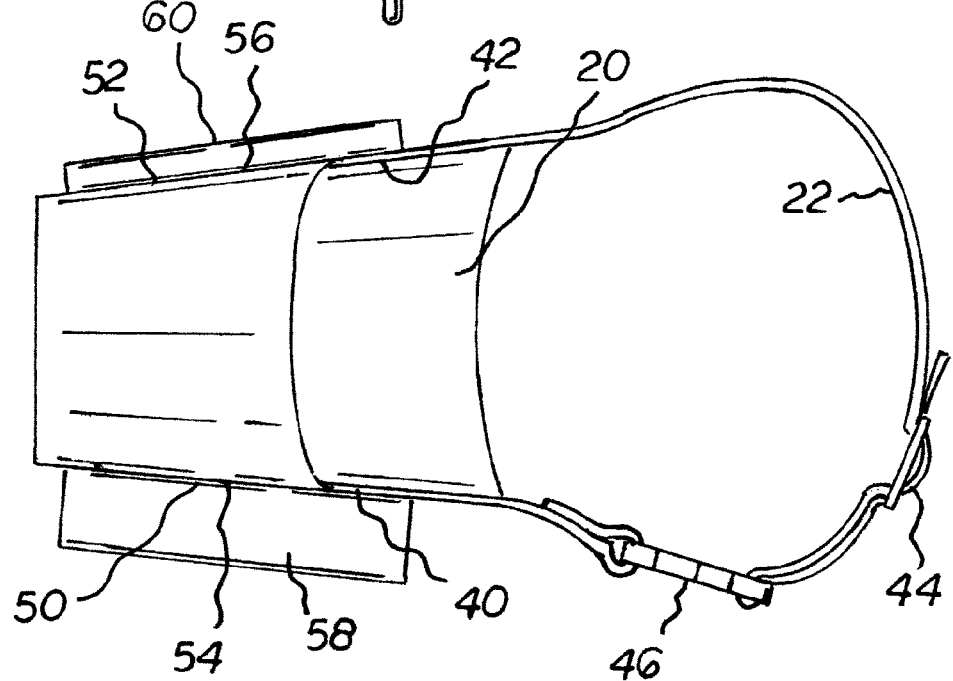
FIG. 4 is a plan view of the muzzle shown in the prior Figures.

With reference now to the drawings, and in particular to FIG. 1 thereof, the preferred embodiment of the new and improved dog tooth brushing system embodying the principles and concepts of the present invention and generally designated by the reference numeral 10 will be described.

The present invention, the dog tooth brushing system 10 is comprised of a plurality of components. Such components in their broadest context include left and right side sections with windows and flaps, a lower section, an upper section, a rear section, and securement assembly. Such components are individually configured and correlated with respect to each other so as to attain the desired objective.

The dog tooth brushing system 10 of the present invention is for removable positioning adjacent to a face of a dog, retaining a jaw of the dog closed and selectively providing access to an oral cavity of the dog. The positioning and retaining and brushing are done economically in a safe and convenient manner to the dog and to a care giver. First provided in the preferred embodiment are a left side section 14, a similarly configured right side section 16, a lower section 18, an upper section 20 and a rear section 22.

The left side section 14 and the right side section 16 are each generally vertically oriented and formed in a generally rectangular configuration. Each side section has a horizontal top edge 26 with a top length. Each side section has a vertical front edge 28 with a front height. Each side section has an angled rear edge 30. The left side section has an area positionable over the left side of the face of the dog. The right side section has an area positionable over the right side of the face of the dog. The top lengths and the front heights of the side sections are sufficient for covering the majority of the oral cavity of the dog.

The lower section 18 is positionable beneath the face of the dog and is formed integrally with the left side section and the right side section to form a U-shaped configuration. The lower section has a rectangular configuration with a lower length.

The upper section 20 is positionable above the face of the dog and is formed in an inverted U-shaped configuration with a left free lower end 34 and a right free lower end 36. The left free lower end is coupled with the left side section along the top edge adjacent to the front edge. The right free lower end is coupled with the right side section along the top edge adjacent to the front edge. The upper section extends upwardly and forwardly from the side sections. The upper section has a rectangular configuration with a length. The upper and lower and side sections form a closed loop adapted to be slid over the face of the dog by a care giver during use.

The rear section 22 is positionable behind the head of the dog and is formed in a C-shaped configuration with a left free forward end 40 and a right free forward end 42. The left free forward end is coupled with the left side section along the rear edge adjacent to the upper edge and extending rearwardly. The right free forward end is coupled with the right side section along the rear edge adjacent to the upper edge and extending rearwardly. The rear section has a rectangular configuration with a height. The rear section has an adjustment component 44 for varying the length of the rear section. The rear section has a coupling component 46 for coupling and uncoupling the system with respect to the head of the dog.

A left side window 50 is provided in the left side section. A similarly configured right side window 52 is provided in the right side section. Each side window is in a rectangular configuration having a height between 60 and 90 percent of the height of the front edge of the side sections. Each side window has a length between 60 and 90 percent of the length of the upper edge of each side section. A rectangular vertical strengthen strip 54 extends vertically though each window dividing the window into two similarly configured openings. Each opening has an area. Each strengthen strip has an area between 10 and 30 percent of the area of each opening.

A left flap 58 in a rectangular configuration is provided. The left flap is sized to cover the left window. A similarly configured right flap 60 in a rectangular configuration is provided. The right flap is sized to cover the right window. The left flap has a free lower edge and an upper edge attached between the left lower free end of the upper section and the left upper edge of the left side section. The right flap has a free lower edge and an upper edge attached between the right lower free end of the upper section and the right upper edge of the right side section.

Lastly, a securement assembly is provided. The securement assembly includes a fixed lower strip 64 of hook and loop fastener attached to each side section adjacent to the lower section. The securement assembly also includes a fixed upper strip 68 of hook and loop fastener attached to the each side section adjacent to each upper section respectively. The securement assembly also includes a repositionable strip 72 of hook and loop fastener attached to the free lower edge of each flap. Each repositionable strip is adapted to couple with an associated fixed lower strip to close an one of the windows. Each repositionable strip is adapted to couple with an associated one of the fixed upper strips to open an associated one of the windows and allow access by a care giver to the oral cavity of the dog wearing the system.

The present invention is particularly suitable for veterinary medicine and the allied health sciences. In these fields some of the animals such as dogs that are worked on may be dangerous and bite the care giver or health provider. Often the health of the animal needs to be assessed, and assessment requires access to the mouth. The oral cavity is a very good indicator of an animal's health. Many diseases directly involving the oral cavity or the internal organs can be accessed through examination of the mouth and teeth. Access to the mouth is important in emergency situations to evaluate shock and circulatory parameters as well as hepatic injury or renal disturbances. However, until now the need for protection would mean that access to the mouth would be denied. Care givers have had to trade-off access to the oral cavity in order to gain protection from dangerous or frightened animals. A muzzle was needed that would provide a window that would give the health provider a means to inspect the oral cavity and gather the important information it can provide. Many care givers are prevented in many situations from being allowed access to the mouth during animal examinations. After years of frustration it is time for a muzzle to help remedy the situation and this obvious handicap.

The present invention utilizes a muzzle made of various essentially inextensible substances from leather to man-made synthetic fabrics. The fabric material, no matter what its form, will allow to it to conform over the animal's face and to have strength enough to keep the animal's jaw from opening and biting or harming the care giver. This invention has taken into account the protection factor that muzzles have provided but in addition has added the ability to examine the mouth through a window in the muzzle. The muzzle is therefore more complicated than others heretofore developed because it includes additional substance such as a window flap or sliding portions of a muzzle.

The additional substance and nature of the invention includes the presence of a window on parts of the muzzle that when placed over each other allows the oral cavity to come into view. This window requires removal of some of the fabric normally found on other muzzles. With the addition of a strengthening strip of fabric centrally located in the window, security of the muzzle will continue. Security is also retained because the window or windows not being used are closed down by various hardware and/or ties placed on the sides or above said window. The invention also includes a form that utilizes a flap on both sides of the muzzle that remains static but wherein the windows are covered by the flaps by means of hardware not normally found on muzzles. The substance of the hardware includes hook and loop fasteners, turn buttons, grommets, zippers, sockets, studs, washers, rivets and laces and any other binding type of hardware not specifically mentioned. Its form in part has been described by several designs over the years The present muzzle exceeds all previously developed muzzles in its ability to afford protection from the biting or crushing teeth while at the same time optimizing the ability of a care giver to examine the oral cavity.

The animal muzzle of the present invention is designed with an easily accessible way to see the animal's molars; premolar and canine tooth along the entire side of its face. The view of the teeth is allowed without removing the muzzle. A portion of the muzzle is opened by lifting flaps. The muzzle retains its ability to keep the jaws shut and thereby preventing the animal from biting. There is a thin piece of inextensible fabric, preferably nylon, attached in the center of both sides of the muzzle when the flaps are opened. This prevents the animal from nipping the owner or care giver of the animal. There is a side flap on each side of the muzzle made of inextensible fabric, preferably nylon, the flaps are held down with fasteners, preferably hook and loop fasteners.

In one embodiment, both sides of the muzzle contain straps around brass buttons holding the side slits of the muzzle together. When the straps are raised the windows widen revealing the side teeth of the animal.

In the alternative, both sides of the muzzle will have a zipper which when zipped closed the animals side teeth are not visible, and when zipped open the animals side teeth are clearly visible. The side flaps are held down by twist top buttons. The entire muzzle itself is twist able. When the muzzle's outer sheath is turned upon a lower sheath both sides of teeth upper and lower rows are visible, however when the sheath is rotated back to its original position the teeth are no longer visible. When the muzzle's outer sheath is turned only one side of the animal's teeth is visible the other side remains hidden.

Lastly provided is a brushing assembly 100 having a flexible primary strap 104. The flexible primary strap has an upper end 106 and a lower end 108 and an intermediate extent 110 between the upper end and the lower end. A D-ring 112 couples the upper end of the flexible primary strap to the dog tooth brushing system beneath the left side window and the right side window. A primary loop 114 is formed in the lower end of the flexible primary strap for user gripping purposes and for control of the dog. The flexible primary strap includes an intermediate loop 116 of a size smaller than the primary loop.

The brushing assembly also includes a toothbrush 120. The toothbrush has a linear central extent 122 with a first end. The first end is formed with a first brush 124 of a first size. The toothbrush has a second end is formed with a second brush 126. The second brush has a second size different from the first size. The toothbrush is removably coupled to the flexible primary strap by passage of a brush through the intermediate loop. The tooth brush is adapted to clean teeth of an animal through the left side window and the right side window.

The brushing assembly 100 also includes a flexible secondary strap 130. The flexible secondary strap has an upper end 132 and a lower end 134. The D-ring couples the upper end of the flexible secondary strap to the windowed muzzle system beneath the left side window and the right side window. Stitching 136 couples the upper end of the primary flexible strap and the upper end of the flexible secondary strap. A secondary loop 138 is formed in the lower end of the flexible secondary strap for user gripping purposes and control of the dog.

Lastly provided in the flexible secondary strap is a secondary small loop 140 formed above the secondary loop. The secondary small loop is of a size smaller than the secondary loop. The secondary small loop is adapted for the removable receipt of the toothbrush and to maintain control of the dog.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A dog tooth brushing system comprising:
   left and right side sections, a lower section, an upper section and a rear section;
   a left window in the left side section and a similarly configured right window in the right side section;
   a left flap and a similarly configured right flap, each flap having a configuration and a size to cover the left window and right window respectively;
   a securement assembly adapted to selectively retain each flap in a raised orientation above the window and in the alternative in a lowered orientation covering the window; and
   a brushing assembly having a flexible strap coupled to the lower section, the brushing assembly including a toothbrush removably coupled to the flexible strap.

2. The system as set forth in claim 1 wherein the flexible strap has an upper end and a lower end and an intermediate extent, a D-ring coupling the upper end of the flexible strap to the dog tooth brushing system beneath the left side window and the right side window, a primary loop formed in the lower end of the flexible strap for user gripping purposes and for control of the dog, the flexible strap including an intermediate loop of a size smaller than the primary loop.

3. The system as set forth in claim 2 wherein the toothbrush has a linear central extent with a first end formed with a first brush of a first size, the toothbrush being removably coupled to the flexible primary strap by passage of a brush through the intermediate loop, the tooth brush adapted to clean teeth of an animal through the left side window and the right side window.

4. The system as set forth in claim 3 wherein the toothbrush has a second end formed with a second brush, the second brush having a second size different from the first size.

5. The system as set forth in claim 2 wherein the brushing assembly includes a flexible secondary strap 130, the flexible secondary strap having an upper end and a lower end, the D-ring coupling the upper end of the flexible secondary strap to the dog tooth brushing system beneath the left side window and the right side window, a secondary loop formed in the lower end of the flexible secondary strap for user gripping purposes and control of the dog.

6. A dog tooth brushing system (10) for removable positioning adjacent to a face of a dog, retaining a jaw of the dog closed and selectively providing access to an oral cavity of the dog, the positioning and retaining and brushing being done economically in a safe and convenient manner to the dog and to a care giver, the system comprising, in combination:
   a left side section (14), a similarly configured right side section (16), a lower section (18), an upper section (20), and a rear section (22);
   the left side section (14) and the right side section (16) each being generally vertically oriented and formed in a generally rectangular configuration, each side section having a horizontal top edge (26) with a top length, each side section having a vertical front edge (28) with a front height, each side section having an angled rear edge (30), the left side section having an area positionable over a left side of the face of the dog, the right side section having an area positionable over a right side of the face of the dog, the top lengths and the front heights of the side sections being sufficient for covering the majority of the oral cavity of the dog;
   the lower section (18) positionable beneath the face of the dog and formed integrally with the left side section and the right side section to form a U-shaped configuration, the lower section having a rectangular configuration with a lower length;
   the upper section (20) positionable above the face of the dog and formed in an inverted U-shaped configuration with a left free lower end (34) and a right free lower end (36), the left free lower end coupled with the left side section along the top edge adjacent to the front edge, the right free lower end coupled with the right side section along the top edge adjacent to the front edge, the upper section extending upwardly and forwardly from the side sections, the upper section having a rectangular configuration with a length, the upper and lower and side sections forming a closed loop adapted to be slid over the face of the dog by a care giver during use;
   the rear section (22) positionable behind the head of the dog and formed in a C-shaped configuration with a left free forward end (40) and a right free forward end (42), the left free forward end coupled with the left side section along the rear edge adjacent to the upper edge and extending rearwardly, the right free forward end coupled with the right side section along the rear edge adjacent to the upper edge and extending rearwardly, the rear section having a rectangular configuration with a height, the rear section having an adjustment component (44) for varying the length of the rear section, the rear section having a coupling component (46) for coupling and uncoupling the system with respect to the head of the dog;
   a left side window (50) in the left side section and a similarly configured right side window (52) in the right side section, each side window being in a rectangular configuration having a height between 60 and 90 percent of the height of the front edge of the side sections, each side window having a length between 60 and 90 percent of the length of the upper edge of each side section, a rectangular vertical strengthen strip (54) extending vertically though each window dividing the window into two similarly configured openings, each opening having an area, each strengthen strip having an area between 10 and 30 percent of the area of each opening;
   a left flap (58) and a similarly configured right flap (60), each flap having a rectangular configuration and a size to cover the left window and right window respectively, the left flap having a free lower edge and an upper edge attached between the left lower free end of the upper section and the left upper edge of the left side section, the right flap having a free lower edge and an upper edge attached between the right lower free end of the upper section and the right upper edge of the right side section;
   a securement assembly including a fixed lower strip (64) of hook and loop fastener attached to each side section adjacent to the lower section, the securement assembly also including a fixed upper strip (68) of hook and loop fastener attached to the each side section adjacent to each upper section respectively, the securement assembly also including a repositionable strip (72) of hook and loop fastener attached to the free lower edge of each flap, each repositionable strip adapted to couple with an associate fixed lower strip to close an associated window, each repositionable strip adapted to couple with an associate fixed upper strip to open an associated window and allow access by a care giver to the oral cavity of the dog wearing the system; and a brushing assembly (100) having a flexible primary strap (104), the flexible primary strap having an upper end (106) and a lower end (108) and an intermediate extent (110) between the upper end and the lower end, a D-ring (112) coupling the upper end of the flexible primary strap to the dog tooth brushing system beneath the left side window and the right side window, a primary loop (114) formed in the lower end of the flexible primary strap for user gripping purposes and for control of the dog, the flexible primary strap including an intermediate loop (116) of a size smaller than the primary loop;

the brushing assembly including a toothbrush (120), the toothbrush having a linear central extent (122) with a first end formed with a first brush (124) of a first size, the toothbrush having a second end formed with a second brush (126), the second brush having a second size different from the first size, the toothbrush being removably coupled to the flexible primary strap by passage of one of the brushes through the intermediate loop, the tooth brush adapted to clean teeth of an animal through the left side window and the right side window; and the brushing assembly (100) including a flexible secondary strap (130), the flexible secondary strap having an upper end (132) and a lower end (134), the D-ring coupling the upper end of the flexible secondary strap to the dog tooth brushing system beneath the left side window and the right side window, stitching (136) coupling the upper end of the primary flexible strap and the upper end of the flexible secondary strap, a secondary loop (138) formed in the lower end of the flexible secondary strap for user gripping purposes and control of the dog, the flexible secondary strap including a secondary small loop (140) formed above the secondary loop, the secondary small loop being of a size smaller than the secondary loop, the secondary small loop adapted for removable receipt of the toothbrush.

\* \* \* \* \*